C. THOMAS.
Running Gear for Vehicles.
No. 111,492.
Patented Jan. 31, 1871.
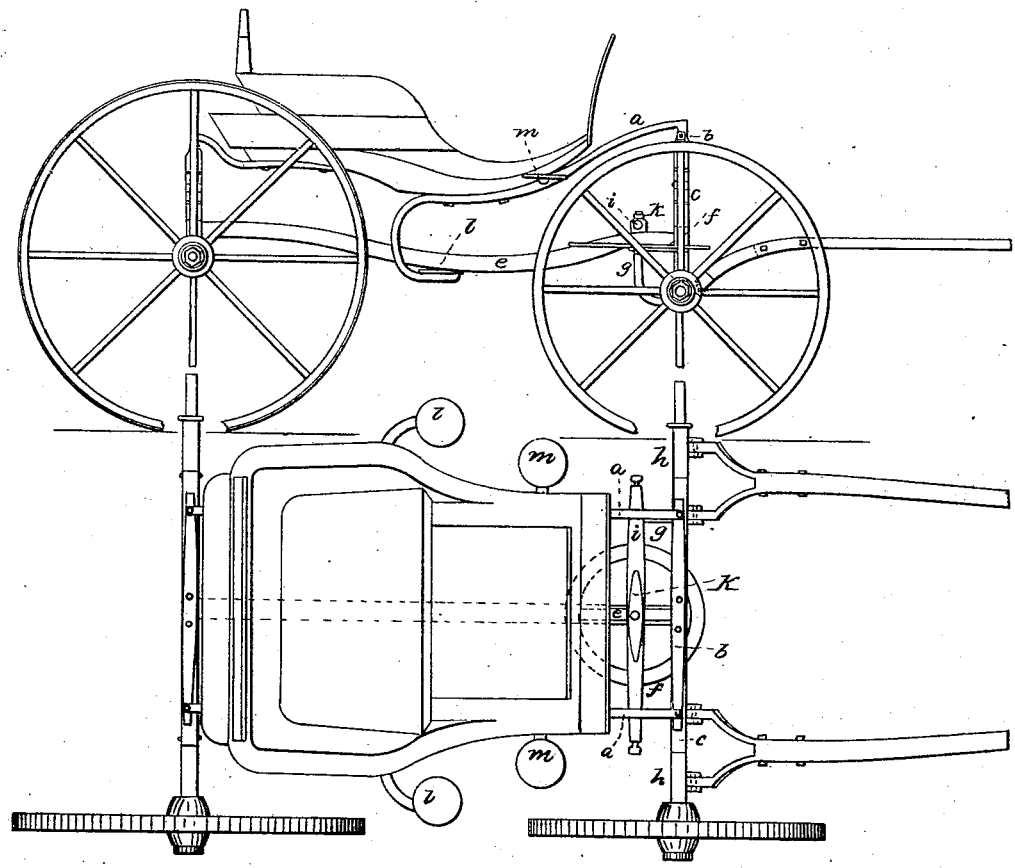
Witnesses:
Inventor:
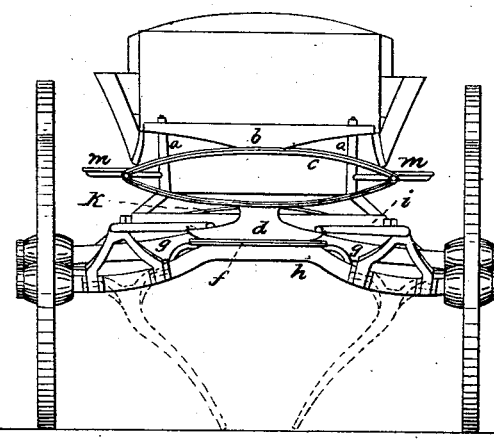

UNITED STATES PATENT OFFICE.

CHAUNCEY THOMAS, OF BOSTON, MASSACHUSETTS.

IMPROVEMENT IN VEHICLES.

Specification forming part of Letters Patent No. 111,492, dated January 31, 1871.

*To all whom it may concern:*

Be it known that I, CHAUNCEY THOMAS, of Boston, in the county of Suffolk and State of Massachusetts, have invented Improvements in Vehicles; and I do hereby declare that the following, taken in connection with the drawing which accompanies and forms part of this specification, is a description of my invention sufficient to enable those skilled in the art to practice it.

This invention relates to certain new and useful improvements in the details of construction, combination, and arrangement of parts of four-wheeled vehicles, one part of my invention consisting in the arrangement by which the axles are so far separated from each other as to give ample room for entrance to and for egress from the vehicle, while the horse is no farther removed from the carriage-seat than in vehicles where the axles are placed much nearer together; and my invention further consists in certain peculiarities in the arrangement of the whiffletree, and in the arrangement of the shafts; also, in the arrangement of the steps with reference to the general arrangement of the running-gear; and in the arrangement of the front axle, front spring, and the front irons which support the carriage-body.

In the drawing, which illustrates an embodiment of my invention, Figure 1 is a side elevation of a vehicle containing my improvements. Fig. 2 is a plan, and Fig. 3 is a front-end view thereof.

The body of the vehicle may be of any desired size and form, and is hung at the rear in any well-known manner. The front irons $a\ a$ are extended forward and upward beyond the front of the body, and rest on a cross-bar, $b$, placed over an elliptic spring, $c$, which rests on a bolster, $d$, into which the front end of the perch $e$ is mortised, the perch being considerably longer than when the front axle is brought quite near to or under the body of the vehicle.

The turn-plate $f$ is fixed to the bolster $d$ and to the perch $e$, so that the draw-bolt will be located back of the front axle, and between it and the front of the body, the draw-bolt passing through the perch, and through an iron, $g$, fixed to the front axle, $h$, which is bent upward at the center, for a reason to be explained beyond.

In carriages it is common to unite the shafts by a cross-bar placed at considerable distance from the ends of the shafts, which are coupled to the front axle; hence it is necessary to so harness a horse in such shafts as to give him a sufficient clearance from the said cross-bar.

In my invention I dispense with the cross-bar, which allows of the horse being brought as near to the axle $g$ as he could be brought to the cross-bar between the shafts, so that it will now be seen how and why I can separate the axles and yet not increase the distance of the horse from the driver.

Where shafts are connected by a cross-bar so as to make a kind of frame, their free ends have but little side vibration, if the connections of the shafts to the axle are reasonably well fitted; but as my shafts are not connected with each other, I bifurcate the irons on the rear end of each shaft, as seen in Figs. 2 and 3, to prevent side movement of the free ends of the shafts, so that each shaft has two connections with the axle, instead of two for the pair of shafts, as is the common practice.

Having dispensed with the cross-bar between the shafts, I place the whiffletree $i$ back of the front axle, and preferably pivot the whiffletree in the line of the center of the draw-bolt.

To keep the whiffletree steady, and to prevent it from rattling and jarring, I force it down against the surface, on which it turns by the stress of a spring, $k$, which may be varied by turning a nut down upon the center of the spring.

The whiffletree being usually pivoted to the cross-bar, uniting each of a pair of shafts, the draft is all transferred to the connections of the shafts with the axle, causing said connections to wear rapidly; but in my invention none of the stress exerted on the whiffletree is operative on the connections of the shafts with the front axle, so that said connections will wear a long time without becoming loose or needing adjustment.

The upward bend given to the irons $a\ a$ allows me to set the front spring, which is arranged transversely with respect to the carriage, so high that I am enabled to bend upward the center of the front axle, which gives room for the horse to extend his hind legs well to the rear without danger to his hocks, and so allows of bringing the animal very near to the front axle.

By the construction and arrangement described I am enabled to place my steps very conveniently. It will be seen that the lower step, *l*, is located quite well forward of the rear wheels, and is extended outward to about the center line of the wheel-fellies, while the upper step, *m*, is placed nearer to the body, and so that, in turning, the forward wheel swings between the steps without interfering with either.

I claim—

1. The whiffletree arranged at the rear of the front axle-tree.

2. The arrangement of the whiffletree upon a pivot substantially in line with the axis of the draw-bolt.

3. The combination, with the whiffletree, of the convex steadying and presser spring *k*, substantially as and for the purpose specified.

4. The relative arrangement of the front supporting-irons, *a a*, cross-bar *b*, transverse front elliptic spring, *c*, and upward-bent front axle *h*, substantially as shown and described.

5. The bent irons *a a*, secured to the cross-bar, and terminating with a step, *l*, and having an intermediate step, *m*, the steps being arranged substantially as shown and described.

CHAUNCEY THOMAS.

Witnesses:
J. B. CROSBY,
FRANCIS GOULD.